United States Patent [19]

Gartland et al.

[11] Patent Number: 5,049,220

[45] Date of Patent: Sep. 17, 1991

[54] METHOD FOR APPLYING AN APPLIQUE ON THE SIDEWALL OF A CURED TIRE

[75] Inventors: Robert J. Gartland, Youngstown; Anthony F. Finelli, Akron; Anthony J. Bell, Stow, all of Ohio

[73] Assignee: The Goodyear Tire & Rubber Company, Akron, Ohio

[21] Appl. No.: 498,504

[22] Filed: Mar. 26, 1990

[51] Int. Cl.$^5$ .............. B60C 13/04; B29B 17/00; C08L 47/00

[52] U.S. Cl. .............. 156/116; 152/524; 152/525; 152/DIG. 12; 525/237

[58] Field of Search ............. 152/523, 524, 525, 237, 152/DIG. 12; 525/237; 156/116; 40/587, 616

[56] References Cited

U.S. PATENT DOCUMENTS

| | | | |
|---|---|---|---|
| 4,220,564 | 9/1980 | Tanimoto | 525/237 |
| 4,684,431 | 8/1987 | Shurman | 156/116 |
| 4,790,365 | 12/1988 | Sandstrom | 152/510 |
| 4,967,818 | 11/1990 | Gartland | 156/116 |

FOREIGN PATENT DOCUMENTS

| | | | |
|---|---|---|---|
| 54-132907 | 10/1979 | Japan | 152/525 |
| 55-152605 | 11/1980 | Japan | 152/525 |
| 58-34834 | 3/1983 | Japan | 152/525 |

*Primary Examiner*—Michael W. Ball
*Assistant Examiner*—Gregory J. Wilber
*Attorney, Agent, or Firm*—Alvin T. Rockhill

[57] ABSTRACT

Tires having white sidewalls are very popular in the United States and Canada. This invention discloses a process for preparing such tires having decorative appliques thereon. By practicing the process of this invention, tires having better uniformity can be built at lower costs than when standard tire building techniques are utilized. This invention specifically relates to a method of preparing a pneumatic rubber tire having a decorative applique on the sidewall thereof which comprises (a) applying the decorative applique to the sidewall of a cured tire and (b) binding the decorative applique to the sidewall by the application of heat and pressure; wherein the decorative applique is comprised of from about 25 weight percent to about 75 weight percent syndiotactic 1,2-polybutadiene or blends of SPBD having melting points which are within the range of about 70° C. to about 160° C. and from about 25 weight percent to about 75 weight percent of at least one polydiene rubber which is blended with said syndiotactic 1,2-polybutadiene, sulfur, zinc oxide and at least one pigment or colorant.

21 Claims, No Drawings

METHOD FOR APPLYING AN APPLIQUE ON THE SIDEWALL OF A CURED TIRE.

BACKGROUND OF THE INVENTION

White sidewall tires are very popular in the United States and Canada. Tires having other types of appliques on the sidewalls thereof, such as lettering, logos, and the like, are also very popular. However, the construction of tires having white sidewalls or decorative appliques on the sidewall thereof is a complicated procedure. It involves the coextrusion of a black sidewall rubber with a white sidewall rubber and laminating a protective cover strip over the white rubber to form a sidewall preassembly. This tire sidewall preassembly is then applied in sequence with the other required tire components to the tire building drum to form a green or uncured tire. The green tire is then typically cured in a tire press, with the desired applique being formed by the grooves in the tire mold. After the tire has been cured, it is carefully ground and buffed to expose the decorative applique which was previously covered and protected by the cover strip.

Coextrusion is a complicated process which involves the utilization of sophisticated equipment and a large number of profile dies. The grinding and buffing step which is required to remove the cover strip is also complicated and labor intensive. These additional steps which are required in building tires having decorative appliques on a sidewall thereof add significantly to the cost of building the tire.

In conventional white sidewall tires, the white rubber component represents a very substantial portion of the sidewall. However, it is desirable for tires to have thin sidewalls in order to attain desired performance characteristics. Accordingly, the decorative applique on the sidewall of a tire should be as thin as possible. Nevertheless, certain production and performance criteria has limited the degree to which the thickness of sidewall applique can be reduced.

There are additional problems associated with tires having decorative applique on a sidewall thereof which are built using standard techniques. For instance, such tires have more blemishes, imperfections, and voids in the sidewall area as compared to black sidewall tires. Additionally, problems associated with the white sidewall splice opening sometimes also occur. Misalignment of the white sidewall preassembly relative to mold grooves is a frequently encountered problem which leads to blemished tires. The grinding procedure used in building standard tires having decorative appliques on a sidewall thereof some times leads to the formation of surface crack sites.

For the aforementioned reasons, tires having decorative appliques on a sidewall thereof and the conventional procedures used in building such tires leave much to be desired. To obviate these shortcomings associated with standard techniques for building tires having decorative appliques on a sidewall thereof, it has been proposed to replace the previously known sidewall decorative features with appliques which are painted on to conventional black wall tires. However, painting designs on to the sidewall of tires has not proven to be a satisfactory answer to the problem. This is largely due to the fact that designs which are painted on are quite thin and can be easily damaged by scraping, scuffing and the like.

The concept of applying premolded tire sidewall appliques to standard black wall tires during a molding and curing operation has also been proposed. For example, such a procedure is described in European patent application Publication No. 249,918. However, such procedures have not proven to be entirely satisfactory. For instance, difficulties have been encountered with maintaining adequate adhesion between the sidewall applique and the tire. More specifically, tires made utilizing such techniques typically have inferior scuff resistance such that the applique fails at the interface.

SUMMARY OF THE INVENTION

By practicing the technique of this invention, uncured tire sidewall appliques can be successfully applied to standard cured black wall tires. These appliques can be affixed to cured tires putting them in a specific location in the tire, such as a white sidewall groove, and applying temperature and pressure by a mechanism for a period of time which is sufficient to obtain satisfactory adhesion. This technique involves utilizing decorative appliques which are comprised of from about 25 weight percent to about 75 weight percent syndiotactic 1,2-polybutadiene and from about 25 weight percent to about 75 weight percent of at least one polydiene rubber. In the method of this invention, the decorative design is simply applied to the sidewall of a standard black wall tire with the applique/tire being subsequently heat treated so as to permanently affix the decorative design or applique to the sidewall thereof.

This invention specifically discloses a method of preparing a pneumatic rubber tire having a decorative design on the sidewall thereof which comprises (a) applying the decorative design to the sidewall of a cured tire and (b) binding the decorative design to the sidewall by the application of heat and pressure: wherein the decorative design is comprised of from about 25 weight percent to about 75 weight percent syndiotactic 1,2-polybutadiene or blends of SPBD having a melting point which is within the range of about 70° C. to about 160° C. and from about 25 weight percent to about 75 weight percent of at least one polydiene rubber which is cocurable with said syndiotactic 1.2-polybutadiene, at least one pigment or colorant, sulfur, and zinc oxide.

DETAILED DESCRIPTION OF THE INVENTION

Standard cured black wall tires are utilized in manufacturing the tires of this invention which have a decorative applique on a sidewall thereof. The cured black wall tire which is utilized is built utilizing conventional procedures which are well known to persons skilled in the art of building black wall tires. The tire is then cured in a mold utilizing standard curing procedures. In accordance with this invention, the decorative applique is affixed as desired to the sidewall of the cured black wall tire. The decorative applique can be applied to the sidewall of the tire once the tire has been cured. It is advantageous to position the decorative applique on the tire in a predesigned groove or between two scuff ribs prior to heat treatment by an applicator mechanism. Heat treatment consists of the application of pressure and heat for a specific time period to adhere the applique to the sidewall. This heat treatment step will typically be conducted at a temperature within the range of about 100° C. to about 300° C. In most cases it will be preferred to utilize a temperature which is within the range of about 125° C. to about 225° C. with temperatures of about 150° C. to about 175° C. being most preferred. The time needed to securely bind the decorative applique to the sidewall will vary with the temperature employed. Lower heat treatment temperatures require longer times for the applique to become securely affixed to the time sidewall. However, as a general rule, the heat treatment will be carried out for a period of about 0.5 minutes to about 20 minutes. In most cases the heat treatment will be done for a period of 1 minute to 10 minutes with periods of 2 minutes to 8 minutes being most preferred. During the curing process the decorative applique becomes securely bound to the tire sidewall. It is believed that the syndiotactic 1,2-polybutadiene (SPBD) and the diene rubbers in the decorative applique bonds with the rubbers in the sidewall of the cured tire. It is, accordingly, believed that the decorative applique becomes cocured to the standard tire sidewall.

The syndiotactic 1,2-polybutadiene used in the practice of the subject invention normally has more than 65% of its monomeric units in a syndiotactic 1,2-configuration. SPBD can be prepared in an inert organic solvent utilizing the technique described in U.S. Pat. No. 3,901,868 or in an aqueous medium utilizing the process described in U.S. Pat. No. 4,506,031. U.S. Pat. No. 4,506,031 more specifically reveals a process for producing polybutadiene composed essentially of SPBD comprising the steps of:

(A) preparing a catalyst component solution by dissolving, in an inert organic solvent containing 1,3-butadiene (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones, and N,N-dialkylamides, and (b) at least one organoaluminum compound of the formula $AlR_3$, wherein R represents a hydrocarbon radical of 1 to 6 carbon atoms:.

(B) preparing a reaction mixture by mixing said catalyst component solution with a 1,3-butadiene/water mixture containing desired amounts of said 1,3-butadiene;

(C) preparing a polymerization mixture by mixing carbon disulfide throughout said reaction mixture, and (D) polymerizing said 1,3-butadiene in said polymerization mixture into polybutadiene while agitating said polymerization mixture. In the process described therein the crystallinity and melting point of the SPBD can be controlled by adding alcohols, ketones, nitriles, aldehydes or amides to the polymerization mixture.

The SPBD utilized in making the decorative appliques for tires has a melting point which is within the range of about 70° C. to 160° C. It is generally preferred for the SPBD utilized in making decorative white sidewalls for passenger car or truck tires to have a melting point which is within the range of about 75° C. to about 150° C. with a melting point which is within the range of 80° C. to 125° C. being most preferred. The melting points referred to herein are the minimum endotherm values determined from DSC (differential scanning calorimetry) curves.

The compositions utilized in making the decorative appliques of this invention is a blend which is comprised of SPBD and at least one rubber which is cocurable with the SPBD. The rubber used in such blends can be virtually any type of elastomer which contains unsaturation that allows for sulfur curing. Typically, the elastomer will be one or more polydiene rubbers. Some representative examples of suitable polydiene rubbers include cis-1,4-polybutadiene, natural rubber, synthetic polyisoprene, styrene butadiene rubber, EPDM (ethylene-propylene-diene monomer) rubbers, isoprene-butadiene rubbers, and styrene-isoprene-butadiene rubbers. In many cases it will be desirable to utilize a combination of diene rubbers in the blend. For instance, the rubber portion of the blend can be a combination of chlorobutyl rubber, natural rubber, and EPDM rubber. It is particularly preferred to utilize a combination which contains from about 30 weight percent to about 80 weight percent chlorobutyl rubber, from about 15 weight percent to about 55 weight percent natural rubber, and from about 2 weight percent to about 10 weight percent EPDM rubber as the rubber component in such blends. A rubber composition which contains, from about 55 weight percent to about 65 weight percent chlorobutyl rubber, from about 25 weight percent to about 45 weight percent natural rubber, and from about 3 weight percent to about 7 weight percent EPDM rubber is more highly preferred.

The blend utilized in preparing the decorative applique will normally contain from about 25 weight percent to about 75 weight percent SPBD and from about 75 weight percent to about 25 weight percent elastomers which are cocurable with the SPBD. The inclusion of high levels of SPBD results in better adhesion, abrasion, and tear resistance for the cured material. High levels of SPBD also result in increased green strength and stiffness. Additionally, the use of high levels of SPBD reduces green tack which makes handling easier and allows for stacking without the use of a substrate. However, the incorporation of large amounts of SPBD into the blend also results in reduced flexibility and increased modulus. Accordingly, for the best balance of overall properties, the blend utilized will contain from about 33 weight percent to about 67 weight percent SPBD and from about 67 weight percent to about 33 weight percent cocurable rubbers. The blends which are most highly preferred will contain from about 45 weight percent to about 55 weight percent SPBD and from about 55 weight percent to about 45 weight percent of the elastomeric component.

The SPBD used in making the blends from which the appliques are formed can be incorporated into the blend in powder or pellet form. In other words, the SPBD can be in the form of a powder at the time it is compounded with the rubber component utilized in making the blend of which the decorative applique is comprised.

The SPBD powder or pellets can be mixed into the rubber component utilizing standard mixing techniques. However, the mixing is normally carried out at a temperature which is at least as high as the melting point of the SPBD being utilized. During the mixing procedure, the SPBD powder or pellets are fluxed into the rubber with additional desired compounding ingredients. Such mixing is typically carried out in a Banbury mixer, a mil mixer or in some other suitable type of mixing device.

In an alternative embodiment of this invention, the blend utilized in preparing the decorative applique is prepared by inverse phase polymerization. For example, a blend of SPBD with cis-1,4-polybutadiene can be prepared in an organic solvent by inverse phase polymerization. In such a procedure, the cis-1,4-polybutadiene is first synthesized in an organic solvent under solution polymerization conditions. This polymerization can be catalyzed by using a variety of catalyst systems. For instance, a three component nickel catalyst system which is comprised of an organoaluminum compound, a soluble nickel containing compound and a fluorine containing compound can be utilized to catalyze the polymerization. Such a polymerization can also be catalyzed by utilizing rare earth catalyst systems, such as lanthanide systems, which are normally considered to be "pseudo-living". Such rare earth catalyst systems are normally comprised of three components which include (1) an organoaluminum compound, (2) an organometallic compound which contains a metal from Group III-B of the Periodic System, and (3) at least one compound which contains at least one labile halide ion. Metals from Group I and II of the Periodic System can also be utilized as catalysts for polymerizing 1,3-butadiene monomer, into cis-1,4-polybutadiene. The metals which are most commonly utilized in such initiator systems include barium, lithium, magnesium, sodium and potassium with lithium and magnesium being the most commonly utilized. The cis-1,4-polybutadiene cement which is synthesized is then subsequently utilized as the polymerization medium for the synthesis of the SPBD. It will generally be desirable to add additional 1,3-butadiene monomer to the cis-1,4-polybutadiene cement for the synthesis of the SPBD. In some cases, it will also be desirable to add additional solvent. The amount of monomer added will be contingent upon the proportion of SPBD desired in the blend being prepared. It will, of course, also be necessary to add a catalyst system to the rubber cement which is capable of promoting a polymerization which results in the formation of SPBD. A detailed description of such catalyst systems is given in U.S. Pat. No. 3,778,424 which is herein incorporated by reference in its entirety.

The blend of SPBD and rubber will also contain other standard rubber chemicals. For instance, such blends will additionally contain sulfur and at least one desired colorant or pigment. They will also typically contain other rubber chemicals, such as antioxidants, accelerators, oils, and waxes in conventional amounts. For instance, the SPBD/rubber blend will normally contain from about 0.2 to about 8 phr of sulfur. It is generally preferred for the blend to contain from about 0.5 to 4 phr of sulfur with it being most preferred for such blends to contain from 1 to 2.5 phr of sulfur. A primary accelerator is generally also present at a concentration which is within the range of about 0.1 to about 2.5 phr. It is normally preferred for the primary accelerator to be present at a concentration which is within the range of about 0.2 to about 1.5 phr with it being most preferred for the primary accelerator to be at a concentration of 0.3 to 1 phr. Secondary accelerators will also commonly be utilized at a concentration which is within the range of about 0.02 to about 0.8 phr. Secondary accelerators are preferably utilized at a concentration of 0.05 to 0.5 phr with the utilization of 0.1 to 0.3 phr of a secondary accelerator being most preferred. Such SPBD/rubber blends will typically contain from about 1 to about 10 phr of various processing oils and it is generally preferred for such blends to contain from about 2.5 to about 7.5 phr of processing oils. The SPBD/rubber blend will generally contain from about 25 phr to about 100 phr of various fillers such as clay and/or titanium dioxide. It is normally preferred for such blends to contain from about 40 phr to about 80 phr fillers. It should be noted that titanium dioxide acts as both a filler and a white pigment. Some representative examples of colorants that can be utilized in the SPBD/rubber blend to impart desired colors to the decorative appliques include diarylid yellow 17, pththalocy blue 15, diarylid orange 13, and perm red 28 (red 48:1).

After the SPBD/rubber blend has been compounded as desired, it is processed into the desired decorative applique. This can be accomplished by miling and calendering the compounded blend into a continuous sheet and subsequently cutting an applique having the desired shape out of the sheet. Sheets of the compounded SPBD/rubber blend can also be made by continuous cold feed extrusion, such as with twin screw equipment or single screw extruders with mixing sections. Decorative appliques in the form of strips, rings, logos, letters, or numbers can also be prepared by injection molding or transfer molding.

The decorative appliques utilized in the process of this invention that are obtained from calendered film will normally have a thickness which ranges from about 10 mils to about 80 mils (0.010 to 0.080 inch). However, appliques having a thickness within the range of about 15 mils to about 50 mils will normally be utilized to save material. This is because satisfactory performance can normally be obtained without the need for utilizing thicker decorative appliques. Letters, numbers, and logos which are made by calendering will normally have a thickness of about 30 mils to about 50 mils. On the other hand, decorative appliques having a thickness of less than about 40 mils are generally difficult to injection mold. For this reason, appliques which are injection molded will normally have a thickness of at least about 60 mils. There are generally no problems in calendering sheets of the SPBD/rubber component blends which have thicknesses of less than 30 mils. For this reason, thin appliques will normally be calendered into sheets with the desired design being cut therefrom. White sidewall rings which are made by injection molding will generally be from about 60 mils to about 100 mils thick and will preferably be from about 70 mils to about 80 mils thick.

The present invention will be described in more detail in the following examples. The subject invention will also be contrasted to other possible techniques for affixing decorative appliques to the sidewalls of tires in certain comparative examples which are included. These examples are merely for the purpose of illustrating the subject invention and are not to be regarded as limiting the scope of the subject invention or the manner in which it can be practiced. Unless specifically indicated otherwise, all parts and percentages are given by weight.

EXAMPLE 1

A SPBD/rubber blend containing 50 weight percent SPBD, 30 weight percent chlorobutyl rubber, 17.5 weight percent natural rubber and 2.5 weight percent EPDM rubber, based upon total polymers, was prepared using conventional Banbury mixing procedures for non-productive and productive batches. The SPBD/rubber blend also contained 2.00 phr of processing oils, 1.0 phr of antioxidants, 1.0 phr of stearic acid, 27.5 phr of clay, 37.5 phr of titanium dioxide, 1.00 phr of a tackifier, 5.0 phr of zinc oxide, 1.2 phr of sulfur, and 1.93 phr of accelerators. It should be noted that the SPBD utilized in accordance with this invention is a crosslinking thermoplastic resin. However, SPBD is considered to be a rubber in calculating phr (parts per hundred parts of rubber).

The SPBD/rubber blend was Banbury mixed and milled into continuous strips. The strips were then used in injection molding equipment to obtain white sidewall rings which were 65 mils thick. This injection molding process involves heating the SPBD/rubber blend in a temperature controlled barrel and injection of the hot SPBD/rubber blend into a cooler mold to permit the recrystallization of the SPBD. After molding, the white sidewall ring was considered to be dimensionally stable and was stiff in the uncured state. The white sidewall rings made had minimal green tack adhesion to themselves and did not stick together.

A 275 ton Desma injection molding machine was used in making the white sidewall rings. In a typical molding cycle, the operator closes the safety gate located at the clamp/mold area which activates the molding cycle start. The clamp moves forward closing the mold halves and builds sufficient force (clamp tonnage) to hold the mold halves closed against the high injection pressure of the polymer blend into the mold cavity. The SPBD/rubber blend is forced into the mold cavity by the forward motion of the reciprocating screw. Pressure and injection rates are very high initially in order to completely fill the mold cavity before the melt begins to cool and set-up. In fact pressure can reach as high as 22,000 psi ($1.51 \times 10^8$ Pascals). After the mold cavity is almost filled, the pressure and fill rate are reduced to accomplish final filling (hold pressure) and packing the mold cavity. When the cavity sprue gates have solidified, the injection pressure is relieved.

The screw within the injection unit simultaneously rotates to build a shot for injection in the next cycle. While this is occurring, SPBD/rubber blend that has been injected into the mold cavity is cooling and solidifying. After sufficient cooling time, the clamping mechanism is released, the mold is opened and the white sidewall ring segment is removed. The gate is then closed to initiate another cycle.

The injection molding conditions which were typically used are as follows:

| | |
|---|---|
| Barrel temperature | 260° F. (127° C.) |
| Mold temperature | 165° F.–195° F. (74–91° C.) |
| Injection pressure | 19,000 psi ($1.31 \times 10^7$ Pa) |
| Holding pressure | 16,000 psi ($1.10 \times 10^7$ Pa) |
| Back pressure | 50 psi ($3.44 \times 10^5$ Pa) |
| Injection forward time | 3 seconds |
| Holding pressure time | 5 seconds |
| Mold shut time | 125 seconds |
| Screw speed | 50 rpm |

The mold is designed such that the whole ring is molded using a sprue, multiple gated cold runner system. The white sidewall ring was assembled for the proper contour by overlapping tabs being bonded together with a gum stock.

The post-application mechanism consists of a tire sidewall fixturing device that supports the tire in the horizontal position. This tire fixture is mounted on a ball bushing/shaft assembly to easily transport the tire from the heating position to the white sidewall ring clamp-/bonding position. The tire can be rotated on centerline to eliminate hot spots during heating.

The heating system is an array of quartz faced infrared heaters supported parallel to the white sidewall surface with allowances for distance adjustment. Once the sidewall surface of a standard blackwall P195/75R14 cured tire reaches 300° F. (148° C.), the premolded white sidewall ring was positioned between two small scuff ribs already molding into the tire sidewall. The tire and support fixture were placed under the heated clamping ring. A pneumatically controlled positioning rod locates the tire support fixture centerline with respect to the clamping ring centerline to ensure the proper ring location.

The clamping ring is heated to 350° F. (177° C.) to impart the necessary heat. A thermocouple controlled external heater is used to maintain the clamping ring temperature. The clamping ring is pneumatically controlled by four air cylinders to provide the desired bonding pressure of 40 psi ($2.76 \times 10^5$ Pa) for a period of time of six minutes. The pressure applied will be adequate to insure intimate (complete) contact between the surfaces of white sidewall ring and the tire sidewall. The tire support fixture provides the back-up support needed when the clamping ring imparts pressure on the tire sidewall.

The tire was then removed from the fixture. Several tires were successfully built utilizing this procedure. The molded white sidewall exhibited desirable mold release with no blisters or delaminations, excellent mold surface detail with good location of the white sidewall and excellent adhesion.

The tires built were subjected to a series of tests to evaluate the performance and integrity of the white sidewall. The tires passed Department of Transportation (DOT) Endurance FMVSS-109 at full and half tire inflation pressure with no evidence of white sidewall defects.

Three test tires were also subjected to a very severe curb scuff test. In this test the tire's white sidewalls were run against an abrasive curb surface for 300 feet (91 meters). After completion of the test, inspection of the tires revealed no adhesion loss between the white sidewall ring and the tire. However, some of the white SPBD/rubber composition was worn away to expose the black sidewall. This was, however, expected in such a severe test.

The tires built utilizing the procedure of this invention were satisfactory in every way. Additionally, the tires built were superior to conventional white sidewall tires in several respects. For instance, the tires built utilizing the process of this invention were more uniform than standard whitewall tires. For example, they possess better balance from side to side. The removal of standard white sidewall compounds also eliminates problems associated with modulus transitions due to widely different compounding materials within the sidewall construction. The potential for the white splice in standard whitewall tires to open during curing and consequently causing a defect was also eliminated. Misalignment of the white sidewall material relative to the mold groove is a frequently encountered problem in conventional techniques for building whitewall tires which is also eliminated.

COMPARATIVE EXAMPLE 2

In this experiment, tires were built utilizing the procedure described in Example 1 except that the white sidewall rings were made with a blend which did not include SPBD. In an attempt to overcome the problem in preparing and handling the uncured white sidewall rings, the white sidewall rings were precured. Tires were successfully built. However, the tires made utilizing this procedure failed the curb scuff test. This was because there was inadequate adhesion between the precured white sidewall ring and the tire. This example shows that it is not viable to precure decorative tire sidewall appliques because unsatisfactory adhesion results. By including SPBD in the blend used in making the decorative applique, it is not necessary to precure the applique prior to affixing it to the tire sidewall.

EXAMPLES 3-6

SPBD imparts properties to green rubber that are desirable for improved handling characteristics and unique injection molding capability without curing the compound for post applied white sidewall rings. The addition of SPBD having a melting point of 86° C. or 123° C. at any level results in reduced tack, increased stiffness, and increased static modulus for green stocks. In this series of experiments, various levels of SPBD were blended with a white rubber blend containing 60% chlorobutyl rubber, 35% natural rubber and 5% EPDM rubber with 45 phr of titanium dioxide, 55 phr of clays, 4 phr of process oil, 1.0 phr of stearic acid, and 2.0 phr of a tackifier. The SPBD portion was formulated to include 2.0 phr (SP8D) antioxidant, 30.0 phr (SPBD) titanium dioxide, 1.0 phr (SPBD) stearic acid.

The SPBD/rubber blends made were then compounded with 5.0 phr of zinc oxide, 1.2 phr of sulfur and 1.93 phr of accelerators. The productive compounds made were injection molded to obtain uncured 6 inches (15.24 cm) by 6 inches (15.24 cm) by 0.125 inches (3.18 mm) thick test plates. The physical properties of the uncured SPBD/rubber blends made are reported in Table I.

TABLE I

| | | Example | | | |
|---|---|---|---|---|---|
| | | 3 Control | 4 | 5 | 6 |
| SPBD Level (MP 122° C.) | % | 0 | 33 | 50 | 67 |
| Physical Properties for Green Samples | | | | | |
| Hardness, Shore A | | — | 75 | 85 | 90 |
| Tensile | psi | 145 | 590 | 1100 | 1640 |
| Elongation | % | >900 | 260 | 310 | 620 |
| 50% Modulus | psi | 65 | 365 | 570 | 760 |
| 100% Modulus | psi | 75 | 485 | 685 | 810 |
| Crescent Tear | ppi | — | 205 | 265 | 320 |
| Trouser Tear | ppi | — | 145 | 180 | 260 |
| Physical Properties for Cured Samples | | | | | |
| Hardness, Shore A | | 66 | 77 | 84 | 90 |
| Tensile | psi | 1300 | 1470 | 1680 | 2360 |
| Elongation | % | 620 | 470 | 500 | 580 |
| 50% Modulus | psi | 155 | 460 | 660 | 860 |
| 100% Modulus | psi | 250 | 640 | 790 | 980 |
| Crescent Tear | ppi | 165 | 205 | 270 | 380 |
| Trouser Tear | ppi | 60 | 70 | 95 | 160 |

Example 3 was done as a control and did not include any SPBD. Tensile strength and elongation were determined by ASTM D-412. Crescent tear (initial tear resistance) was determined by ASTM D-1004. Trouser tear (tear propagation resistance) was determined by ASTM D-1938.

The mechanical properties such as tensile strength, modulus, tear strength, and hardness increase with increasing SPBD content in the blend regardless of whether the sample is cured or uncured. These property changes are due to the incorporation of the harder SPBD matrix.

The stress-strain data for the polymer blends exhibit an initial linear portion followed by an inflection area and then a gradual rise in stress with extension for both uncured and cured samples. The steepness of the initial linear portion increases with increasing SPBD content. The inflection area represents the yield point where straightening of chains and crystallites begin. Even in the 33/67 blend, the SPBD contributes to the strength property significantly. Thus, the SPBD apparently forms the continuous matrix. For the uncrosslinked samples, rubber has poor strength and, thus, does not contribute to the mechanical strength.

The tear strength (Die C and Trouser) increases with increasing SPBD content (related to the total crystallinity in the sample). The tear resistance (Die C) of the uncured samples is almost as good as for the cured samples. The propagation tear resistance (Trouser) is significantly better for the green samples.

EXAMPLES 7-9

In the SPBD/rubber blend studies, the SPBD forms the continuous phase, and the rubber forms the dispersed phase, which is observed in the jump of physical properties over the control. Rubber has poor strength when uncrosslinked, and, thus, does not contribute to the mechanical properties. However, the thermoplastic SPBD contributes significantly to the strength characteristics. Therefore, the substitution of SPBD having a melting point of 122° C. with SPBD having a melting point of 86° C. in a 50/50 SPBD rubber compound was studied with its effects on mechanical properties and polymer processing.

TABLE II

| Example | | 7 | 8 | 9 |
|---|---|---|---|---|
| SPBD Level | % | 50 | 50 | 50 |
| SPBD MP 122 | phr | 50 | 25 | |
| SPBD MP 86 | phr | | 25 | 50 |
| Physical Properties for Green Samples | | | | |
| Hardness Shore A | | 85 | 82 | 78 |
| Tensile | psi | 880 | 680 | 600 |
| Elongation | % | 310 | 460 | 560 |
| 50% Modulus | psi | 570 | 460 | 350 |
| 100% Modulus | psi | 680 | 510 | 390 |
| Crescent Tear | ppi | 270 | 220 | 190 |
| Trouser Tear | ppi | 180 | 200 | 180 |
| Static Ozone 20% Elong, 7 days | | | | |
| Cracks | | None | None | None |
| Physical Properties for Cured Samples | | | | |
| Hardness, Shore A | | 83 | 80 | 78 |
| Tensile | psi | 1680 | 1660 | 1750 |
| Elongation | % | 490 | 540 | 590 |
| 50% Modulus | psi | 650 | 530 | 470 |
| 100% Modulus | psi | 810 | 650 | 590 |
| Crescent Tear | ppi | 305 | 290 | 260 |
| Trouser Tear | ppi | 85 | 95 | 75 |
| Static Ozone, 20% Elong, 104° F., 7 Days | | | | |
| Cracks | | None | None | None |
| DIN Abrasion Rel Vol Loss | MM3 | 305 | 350 | 360 |
| Peel Adhesion to Tire Sidewall | | | | |
| RT | ppi | 28 | 25 | 23 |
| 160F | ppi | 18 | 14 | 12 |

The replacement of SPBD having a melting point of 122° C. with SPBD having a melting point of 86° C. slightly lowers the mechanical strength properties of the blend. The 50% tensile modulus data for cured and uncured samples illustrates the similarity of the compound at low strains and the effects of using a lower level crystalline SPBD. However, the ultimate tensile strengths of the green samples were half those of cured specimens.

Crosslinking the samples increases the elastic nature of these blends and, thereby, the crescent tear strength (resistance to initiation of a tear). Contrary, the trouser tear values (tear propagation resistance) for the uncured specimens are twice that of cured samples, reflecting the effects of crosslinking and the order arrangement of the network.

All Green and cured samples passed seven days of static ozone testing at 20% elongation with no signs of cracking. The target for this test is three days.

Cured compounds containing an increasing level of SPBD having a melting point of 87° C. to SPBD having a melting point of 122° C. exhibit lower abrasion resistance or a higher material volume loss upon abrading. This reflects the lower level of crystallinity associated with the use of the SPBD having the lower melting point.

Samples of SPBD/rubber blends were tested for peel adhesion at room temperature and 160° F. to evaluate adhesion to a butyl sidewall compound. Peel strengths range from 22-30 ppi at room temperature and 11-19 ppi at 160° F. depending on the type of SPBD polymer used in the white composition. Best values were obtained with blends containing SPBD having a melting point of 122° C. In all tests, white rubber tear was the failure mode.

In Examples 3 and 7-9, stress/strain testing at several elevated temperatures of the 50/50 SPBD/rubber compounds confirms the crosslinking/crystalline nature of blends. (Table III)

TABLE III

| Example | | 7 | 8 | 9 | 3 Control |
|---|---|---|---|---|---|
| PBD Level | % | 50 | 50 | 50 | 0 |
| SPBD MP 122 | pphr | 50 | 25 | | |
| SPBD MP 86 | pphr | | 25 | 50 | |
| Stress/Strain at Room Temp | | | | | |
| Tensile | psi | 1580 | 1550 | 1760 | 1270 |
| Elongation | % | 515 | 560 | 665 | 595 |
| 50% Modulus | psi | 580 | 465 | 395 | 115 |
| 100% Modulus | psi | 745 | 590 | 535 | 205 |
| Stress/Strain at 50° C. | | | | | |
| 50% Modulus | psi | 425 | 335 | 280 | 110 |
| 100% Modulus | psi | 565 | 465 | 405 | 190 |
| Stress/Strain at 100° C. | | | | | |
| 50% Modulus | psi | 155 | 85 | 70 | 75 |
| 100% Modulus | psi | 270 | 160 | 120 | 150 |
| Stress/Strain at 150° C. | | | | | |
| 50% Modulus | psi | 90 | 60 | 75 | 85 |
| 100% Modulus | psi | 150 | 120 | 130 | 155 |

Tensile modulus values at 150° C. show equivalent moduli for the blends as compared to the control. At this temperature, the SPBD crystallinity is essentially eliminated, but crosslinking between the polymers must have occurred since the moduli for the blends are not significantly lower than those for the control. Reduced moduli would be expected if the SPBD were only an uncrosslinked thermoplastic which depended upon crystallinity alone to build modulus at lower temperatures. In addition, testing at 100° C. distinguishes the difference in melting points of the SPBD polymers used. Blends with SPBD having a melting point of 122° C. had higher moduli values as compared to blends with SPBD having a melting point of only 86° C.

In Examples 7-9, experiments were conducted to determine the conditions necessary for post-applying syndiotactic polybutadiene (SPBD)/rubber white sidewalls onto sidewall rubber compounds. Green white sidewall test strips 6 inches (15.2 cm) long, 1 inch (2.54 cm) wide, and 0.063 inches (1.6 mm) thick were placed into recessed grooves of a metal plate used to simulate the contained volume of a tire white sidewall groove. The contained strips were then pressed onto a 6 inch (15.2 cm) × 6 inch (15.2 cm) slab of rubber sidewall compound in a bladder mold assembly. A variable temperature press was used to study adhesion at several temperatures.

A study determined minimum values of press temperature, pressure, and time for adequate adhesion strength. Compression molded white sidewall samples made of Example 7 were pressed onto partially cured slabs of polybutadiene/natural rubber sidewall compound for 2 to 9 minutes at temperatures of 300° F. (149° C.) and 350° F. (177° C.) and pressures from 30 to 90 psi ($2.07 \times 10^5$ Pa to $6.21 \times 10^5$ Pa). The samples were then tested on an Instron for peel adhesion strength. The sample results are given in Table IV. The data trends show that peel adhesion strength is substantially improved at higher temperatures and press times, but is not greatly affected by pressure. Pressing this compound for 3 minutes at 350° F. (177° C.) and 30 psi ($2.07 \times 10^5$ Pa) gives adequate adhesion strength.

TABLE IV

| Sample | Pressure (psi)* | Temp (°F.) | Time (min) | Adhesion Str (ppi)** |
|---|---|---|---|---|
| 1 | 30 | 300 | 7 | 15.7 |
| 2 | 60 | 300 | 7 | 17.9 |
| 3 | 90 | 300 | 7 | 16.3 |
| 4 | 30 | 350 | 7 | 30.3 |
| 5 | 60 | 350 | 7 | 26.7 |
| 6 | 90 | 350 | 7 | 23.0 |
| 7 | 30 | 350 | 5 | 25.5 |
| 8 | 60 | 350 | 5 | 26.7 |
| 9 | 90 | 350 | 5 | 28.2 |
| 10 | 90 | 350 | 3 | 19.8 |
| 11 | 30 | 350 | 2 | 19.2 |
| 12 | 90 | 350 | 2 | 24.1 |

*psi = pounds per square inch
**ppi = pounds per inch width

Experiments were conducted to determine the best white sidewall blend for adhering to staining polybutadiene/natural rubber and non-staining halobutyl/natural rubber sidewall compounds. White sidewall blends containing SPBD were injection molded in a 75-ton (68,000 kg) Van Dorn injection molder to obtain 0.063 inch (1.6 mm) thick green slabs. The test strips 6 inches (15.2 cm) by 1 inch (2.54 cm) wide were prepared from these slabs and bonded against fully cured polybutadiene/natural rubber and non-staining halobutyl/natural rubber according to conditions listed above. Samples were tested at room temperature, 160° F. (71° C.), and after heat aging for 72 hours at 212° F. (100° C.). The results of this experiment are shown in Table V.

TABLE V

| Example | | 7 | 8 | 9 |
|---|---|---|---|---|
| SPBD Level | % | 50 | 50 | 50 |
| SPBD (MP 122° C.) | pphr | 50 | 25 | |
| SPBD (MP 86° C.) | pphr | | 25 | 50 |
| Backing Stock PBD/NR Sidewall Compound | | | | |
| Original Samples | | | | |
| (1) Room Temp | ppi | 12.0 | 15.0 | 13.7 |
| (2) 160° F. | ppi | 4.8 | 7.8 | 6.8 |
| Aged Samples 72 hrs @ 212° F. | | | | |
| (1) Room Temp | ppi | 16.7 | 18.3 | 25.3 |
| (2) 160° F. | ppi | 10.6 | 13.0 | 8.6 |

TABLE V-continued

| Example | | 7 | 8 | 9 |
|---|---|---|---|---|
| Backing Stock Halobutyl/NR Sidewall Compound | | | | |
| Original Samples | | | | |
| (1) Room Temp | ppi | 13.3 | 16.1 | 24.9 |
| (2) 160° F. | ppi | 5.7 | 10.8 | 8.6 |
| Aged Samples 72 hrs @ 212° F. | | | | |
| (1) Room Temp | ppi | 15.3 | 16.8 | 28.6 |
| (2) 160° F. | ppi | 13.3 | 10.7 | 11.8 |

All samples made from the three white sidewall blends had favorable failure mechanisms with varying degrees of white sidewall tear and/or white penetration into the backing stock. However, Example 9 is superior due to its particularly high aged and unaged peel adhesion strength. At 160° F. (71° C.), all of the samples had low adhesion strength, but white sidewall failures were due to tearing instead of bond failure.

Wax and silicone-based mold releases were applied to press plates in a separate experiment to examine the effect of mold release on adhesion. Press plates used to cure the rubber backing were coated with release and allowed to dry. The rubber backing was pressed between the plates at 300° F. (149° C.), and applied to the bladder mold assembly containing the white sidewall strips. After molding, the samples were submitted for peel adhesion testing. Drastic reductions in peel adhesion strength resulted. This demonstrates the need for tire washing or buffing and eliminates the possibility of post-applying white sidewalls to tires taken directly from the tire press if a mold release is used. In Examples 7-9, SPBD compounds can be processed on conventional Banbury mixers, mills, calendering equipment, and injection molders. However, higher processing temperatures are required depending upon the SPBD melting point range. For this reason, extending the scorch time is beneficial. The cure system used in the SPBD/rubber blend should, therefore, be adjusted to match the cure performance of a conventional white sidewall, otherwise delaminations and/or blisters may occur upon heat treatment. Monsanto cure properties of the productive compounds made are reported in Table VI.

TABLE VI

| Example | | 7 | 8 | 9 |
|---|---|---|---|---|
| SPBD Level | % | 50 | 50 | 50 |
| SPBD (MP 122) | pphr | 50 | 25 | |
| SPBD (MP 86) | pphr | | 25 | 50 |
| Monsanto Cure Rheometer, 150C | | | | |
| TS1 | min | 8.5 | 10.2 | 8.7 |
| T25 | min | 12.9 | 14.6 | 12.3 |
| T90 | min | 24.3 | 27.1 | 25.1 |
| Torque, max | dN.m | 22.0 | 21.9 | 21.2 |
| Torque, min | dN.m | 3.1 | 2.4 | 2.1 |
| Delta Torque | dN.m | 18.9 | 19.5 | 19.1 |

The Monsanto Cure Rheometer was run at 302 F. (150 C.), 1 degree arc and 100 cycles per minute for a 60 minute test period. The cure packages used in the compounds listed in Table III were adjusted to reflect the addition of SPBD to the compound. The SPBD is treated as a crosslinkable polymer and not as a filler additive. The SPBD/rubber compound should have a cure time (T90) which is essentially equivalent to that of a standard white sidewall compound used in the black sidewall of a conventional tire.

For examples 7-9, higher processing conditions are required to process SPDB compounds. The use of a lower melting point SPBD reduces the apparent viscosity at a specific temperature and shear rate. This data is reported in Table VII.

TABLE VII

| Example | | 7 | 8 | 9 |
|---|---|---|---|---|
| SPBD Level | % | 50 | 50 | 50 |
| SPBD (MP 122° C.) | pphr | 50 | 25 | |
| SPBD (MP 86° C.) | pphr | | 25 | 50 |
| MPT Apparent Viscosity (KPA*sec) at 120° C. | | | | |
| Shear Rate, 1/sec | | | | |
| 15.3 | | 15.38 | 8.75 | 5.34 |
| 50.4 | | 6.29 | 3.68 | 2.52 |
| 168.0 | | 2.33 | 1.48 | 1.09 |
| 550.0 | | 0.81 | 0.56 | 0.46 |
| MPT Apparent Viscosity (KPA*sec) at 130° C. | | | | |
| Shear Rate, 1/sec | | | | |
| 15.3 | | 12.42 | 6.49 | 4.16 |
| 50.4 | | 4.96 | 2.86 | 2.18 |
| 168.0 | | 1.82 | 1.21 | 0.97 |
| 550.0 | | 0.67 | 0.50 | 0.43 |
| MPT Apparent Viscosity (KPA*sec) at 140° C. | | | | |
| Shear Rate, 1/sec | | | | |
| 15.3 | | 9.17 | 4.80 | 3.95 |
| 50.4 | | 3.86 | 2.35 | 2.05 |
| 168.0 | | 1.69 | 1.06 | 0.95 |
| 550.0 | | 0.62 | 0.48 | 0.40 |

Viscosity measurements were obtained on the MPT (Monsanto Processability Tester). It is a constant rate capillary rheometer designed to measure the viscosity of a compound under processing conditions of temperature and shear rate. Viscosity is measured by the pressure at the entrance to the capillary die at predetermined flow rates. A microprocessor controls the test, allowing a pre-programmed test at four different shear rates (15.3, 50.4, 168., and 550.1/sec).

Several grams were placed into the MPT barrel and preheated for five minutes to ensure melt homogeneity. The die used in this study had a diameter of 0.0787 inches (2.00 mm) and L/D of 16:1, with a 90/60 degree entrance angle. Testing was carried out at temperatures between 120° C. and 140° C. in increments of 10° C.

What is claimed is:

1. A method of preparing a pneumatic rubber tire having a decorative applique on the sidewall thereof which comprises (a) applying the decorative applique having a thickness which ranges from about 10 mils to about 100 mils to the sidewall of a cured tire and (b) binding the decorative applique to the sidewall by the application of heat and pressure; wherein the decorative design is comprised of from about 25 weight percent to about 75 weight percent syndiotactic 1,2-polybutadiene having a melting point which is within the range of about 70° C. to about 160° C. and from about 25 weight percent to about 75 weight percent of at least one polydiene rubber which is cocurable with said syndiotactic 1,2-polybutadiene, sulfur, zinc oxide, and at least one pigment or colorant.

2. A method as specified in claim 1 wherein the rubber is cis-1,4-polybutadiene.

3. A method as specified in claim 1 wherein the polydiene rubber is styrene-butadiene rubber.

4. A method as specified in claim 1 wherein the polydiene rubber is natural rubber or synthetic polyisoprene.

5. A method as specified in claim 1 wherein the polydiene rubber is a blend of a halobutyl rubber, natural rubber, and an EPDM rubber.

6. A method as specified in claim 5 wherein the halobutyl rubber is a chlorobutyl rubber.

7. A method as specified in claim 6 wherein the rubber is comprised of from about 30 to about 80 weight percent chlorobutyl rubber, from about 15 to about 55 weight percent natural rubber, and from about 2 to about 10 weight percent EPDM rubber.

8. A method as specified in claim 7 wherein the blend is comprised of from about 33 weight percent to about 67 weight percent syndiotactic 1,2-polybutadiene.

9. A method as specified in claim 8 wherein the rubber is comprised of from about 55 weight percent to about 65 weight percent chlorobutyl rubber, from about 25 weight percent to about 45 weight percent natural rubber, and from about 3 weight to about 7 weight percent EPDM rubber.

10. A method as specified in claim 9 wherein said blend is comprised of from about 45 weight percent to about 55 weight percent syndiotactic 1,2-polybutadiene or blend of SPBD.

11. A method as specified in claim 10 wherein the melting point of the syndiotactic 1,2-polybutadiene or blend of SPBD is within the range of about 70° C. to about 160° C.

12. A method as specified in claim 10 wherein the melting point of the syndiotactic 1,2-polybutadiene or blend of SPBD is within the range of about 75° C. to about 150° C.

13. A method as specified in claim 10 wherein the pigment or colorant is titanium dioxide.

14. A method as specified in claim 10 wherein the colorant is selected from the group consisting of diarylid yellow 17, pththalocy blue 15, diarylid orange 13, and perm red 28.

15. A method as specified in claim 10 wherein the melting point of the syndiotactic 1,2-polybutadiene or blend of SPBD is within the range of about 80° C. to about 125° C.

16. A method as specified in claim 1 wherein the decorative applique is bound to the sidewall in step (b) at a temperature which is within the range of about 100° C. to about 300° C.

17. A method as specified in claim 1 wherein the decorative applique is bound to the sidewall in step (b) at a temperature which is within the range of about 125° C. to about 225° C.

18. A method as specified in claim 1 wherein the decorative applique is bound to the sidewall in step (b) at a temperature which is within the range of about 150° C. to 175° C.

19. A method as specified in claim 1 wherein the heat and pressure in step (b) are applied for a period of about 0.5 minutes to about 20 minutes.

20. A method as specified in claim 1 wherein the heat and pressure in step (b) are applied for a period of about 1 minute to about 10 minutes.

21. A method as specified in claim 1 wherein the heat and pressure in step (b) are applied for a period of about 2 minutes to about 8 minutes.

* * * * *